United States Patent [19]

Fujii et al.

[11] Patent Number: 4,802,300
[45] Date of Patent: Feb. 7, 1989

[54] FISHING HOOK

[76] Inventors: Toshitaka Fujii; Haruyuki Fujii, both of 481 Gonose-cho, Nishiwaki-shi, Hyogo, Japan

[21] Appl. No.: 64,812

[22] Filed: Jun. 19, 1987

Related U.S. Application Data

[63] Continuation-in-part of Ser. No. 850,036, Apr. 10, 1986, abandoned.

[51] Int. Cl.⁴ ............................................. A01K 85/00
[52] U.S. Cl. .................................. 43/43.16; 43/42.51
[58] Field of Search .................. 43/43.16, 44.82, 44.6, 43/34, 5, 42.7; 29/9

[56] References Cited

U.S. PATENT DOCUMENTS

| | | | |
|---|---|---|---|
| 1,513,400 | 10/1924 | Koski | 43/43.16 |
| 2,531,981 | 11/1950 | Liebe | 43/43.16 |
| 2,539,735 | 1/1951 | Forsyth | 43/43.16 |
| 3,564,748 | 2/1971 | Malecki | 43/42.51 |

FOREIGN PATENT DOCUMENTS

| | | | |
|---|---|---|---|
| 27166 | of 1911 | United Kingdom | 43/43.16 |
| 1204223 | 9/1970 | United Kingdom . | |

Primary Examiner—Kurt Rowan
Attorney, Agent, or Firm—Takeuchi Patent Office

[57] ABSTRACT

A fishing hook having a shank, a bend, and a barb, characterized in that the tip of the barb is flattened to form a wedge-like blade with its blade edge substantially equal in length to the diameter of the bend.

1 Claim, 2 Drawing Sheets

Fig. 5 Fig. 6A Fig. 6B
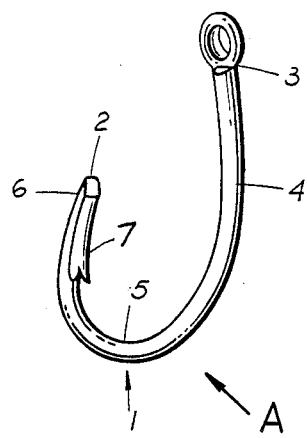 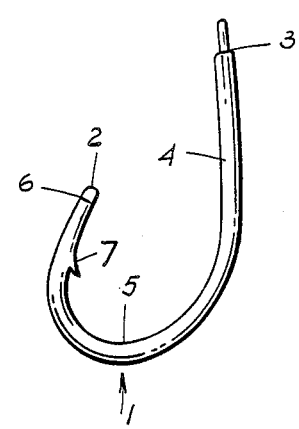 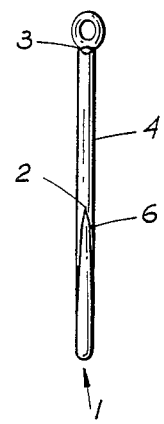
Fig. 7A Fig. 7B Fig. 8A Fig. 8B
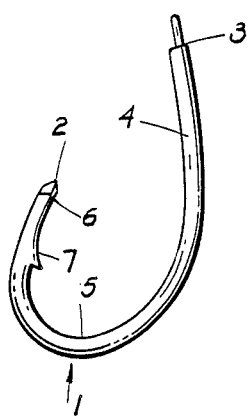 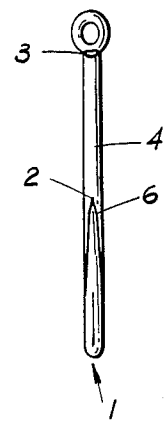 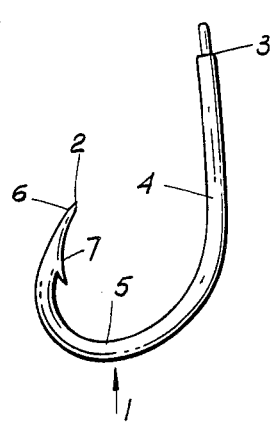 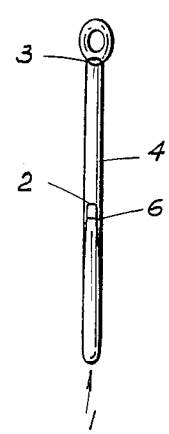

FISHING HOOK

This is a continuation-in-part application of Ser. No. 850,036 filed on Apr. 10, 1986, now abandoned.

BACKGROUND OF THE INVENTION

1. Field of the Invention

The present invention relates to improvements in the tip of a fishing hook.

2. Description of the Prior Art

Fishing hooks used in angling usually have a pointed tip. This tip form has been taken as best suited to fishing hooks. Since a fishing hook has many chances to hit against the rocks or pebbles of a sea or river bed, it is often the case that its pointed tip is damaged by such impacts. such damage will deprive the hook of its sharp pointed tip, and, as a result, the manner of its piercing into fish bodies is not always ideal.

SUMMARY OF THE INVENTION

Accordingly, it is an object of the invention to provide a fishing hook that is resistant to such impacts and retains excellent piercing performance for a long time.

According to the invention there is provided a fishing hook having a shank, a bend, and a barb, characterized in that the tip of the barb is flattened to form a wedge-like blade with its blade edge substantially equal in length to the diameter of the bend.

Other objects, features, and advantages of the invention will be apparent from the following description taken in conjunction with the accompanying drawings.

BRIEF DESCRIPTION OF THE DRAWINGS

FIG. 5 is a perspective view of a fishing hook according to still another embodiment of the invention.

FIGS. 6A and 6B are side and front views of the fishing hook of FIG. 5.

FIGS. 7A and 7B are side and front views of a fishing hook according to yet another embodiment of the invention.

FIGS. 8A and 8B are side and front views of a fishing hook according to another embodiment of the invention.

DESCRIPTION OF THE PREFERRED EMBODIMENTS

Figure 1:
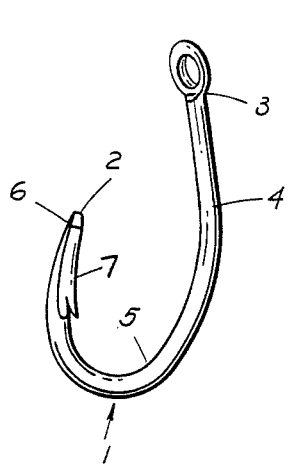
FIG. 1 is a perspective view of a fishing hook embodying the present invention.
Figure 2A:
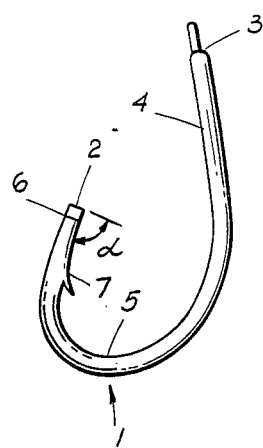
FIGS. 2A and 2B are side and front views of the fishing hook of FIG. 1.
Figure 2B:
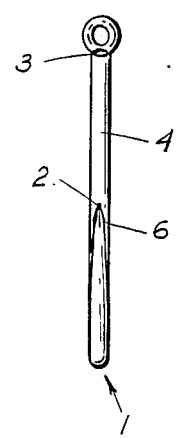

Referring now to FIGS. 1 and 2A and 2B there is shown a fishing hook 1 consisting of an eye 3, a shank 4, a bend 5, a barb 7, and a tip 6. The tip 6 is flattened to form a wedge-like blade 2, the edge line of which is parallel to the plane of the fishing hook 1. The length of edge line is substantially equal to the diameter of the bend 5. As best shown in FIG. 2A, the angle between the edge line of the blade 2 and the barb 7 is approximately 90 degrees. If the angle is substantially less than 90 degrees, a sharp pointed tip is formed at the outer corner of the blade 2, which is liable to damage by impacts as described above.

Figure 3:
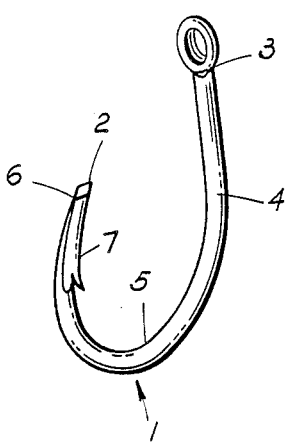
FIG. 3 is a perspective view of a fishing hook according to another embodiment of the invention.
Figure 4A:
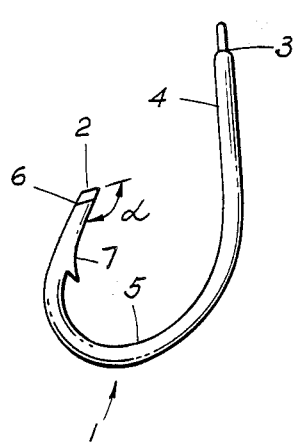
FIGS. 4A and 4B are side and front views of the fishing hook of FIG. 3.
Figure 4B:
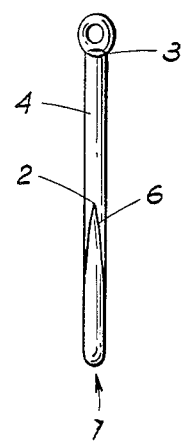

FIGS. 3 and 4A and 4B show another embodiment of the invention. As best shown in FIG. 4A, in this embodiment the angle between the edge line of the blade 2 and the barb 7 is greater than 90 degrees. As a result, a point tip is formed at the inner corner of the blade 2. However, it is protected from impacts because it is disposed on the inside and rarely hits rocks or pebbles.

FIGS. 5 and 6A and 6B show still another embodiment of the invention. As best shown in FIG. 6A, in this embodiment the edge line of the blade 2 is curved convex so as to avoid forming a pointed tip on the outside corner, which is liable to damage by impacts.

FIGS. 7A and 7B show yet another embodiment of the invention. In this embodiment, the edge line of the blade 2 has a V-shape so as to avoid forming a pointed tip on the outside corner even if the angle between the edge line of the blade 2 and the barb 7 is less than 90 degrees.

FIGS. 8A and 8B show another embodiment of the invention. In this embodiment, the tip of the fishing hook 1 is flattened to form a blade 2, the edge line of which is perpendicular to the palne of the fishing hook 1. The fishing hook 1 has a bladed tip instead of a pointed tip so that it is more resistant to impacts.

The fishing hook according to the invention enables its blade to cut the body of a fish sharply and instantly when contacting the fish and its shank penetrate into the fish body deeply. The sharpness of the tip of a fishing hook is retained over a long period of use because the tip of the hook has a wedge-like blade instead of a point which is liable to damage by impacts against the rocks or pebbles of a sea or river bed. Being provided with a blade in place of a pointed tip, the fishing hook of the invention has excellent resistance against breakage or abrasion, thus keeping the sharpness of the tip of the hook over a long period.

While a preferred embodiment of the invention has been described using specific terms, such description is for illustrative purpose only, and it is to be understood that changes and variations may be made without departing from the spirit and scope of the invention as defined in the following claims.

What is claimed is:

1. A fishing hook having a shank (4), a bend (5), and a barb (7), characterized in that a tip (6) of said barb is flattened to form wedge-like blade and that an interior angle $\alpha$ between an edge line of said blade and the longitudinal axis of said barb in a plane of said hook is substantially 90 degrees.

* * * * *